Aug. 26, 1924.

W. HENKER

METHOD OF MOLDING HOLLOW OBJECTS

Filed Aug. 5, 1922

1,506,062

INVENTOR
Willy Henker
BY
Pringle Wright O'Snell
ATTORNEYS

Patented Aug. 26, 1924.

1,506,062

UNITED STATES PATENT OFFICE.

WILLY HENKER, OF BERLIN, GERMANY, ASSIGNOR TO ART INDUSTRIES, INC., A CORPORATION OF NEW YORK.

METHOD OF MOLDING HOLLOW OBJECTS.

Application filed August 5, 1922. Serial No. 579,958.

*To all whom it may concern:*

Be it known that I, WILLY HENKER, a citizen of Germany, a resident of Berlin, in the county of Brandenburg and State of Prussia, Germany, have invented certain new and useful Improvements in Methods of Molding Hollow Objects, of which the following is a specification.

My invention relates particularly to a process of molding objects from compositions containing sulphur and abrasive blastings of metal castings and the product thereof but is especially applicable to the production of products which may be provided with thick hollow walls and to producing products having smooth internal surfaces.

The object of my invention is particularly to provide a process of producing molded objects from compositions containing sulphur and abrasive blastings of metal castings, and the product thereof, but my process is so conducted that objects may be cast with thick walls without danger of cracking due to expansion from the hardening of a residual internal mass of the molten material. A further object is to provide a process of molding with compositions of this character in such a manner as to produce products having smooth internal surfaces. This invention is a further elaboration of the invention as described in and covered by my application upon process of molding and product thereof filed on even date herewith.

Further objects of my invention will appear from the detailed description thereof contained hereinafter.

My invention is capable of embodiment in many different forms and may be carried out with many different kinds of apparatus, but by way of illustration I have shown only one type of apparatus for use in connection therewith in the accompanying drawings, in which—

Figure 1:
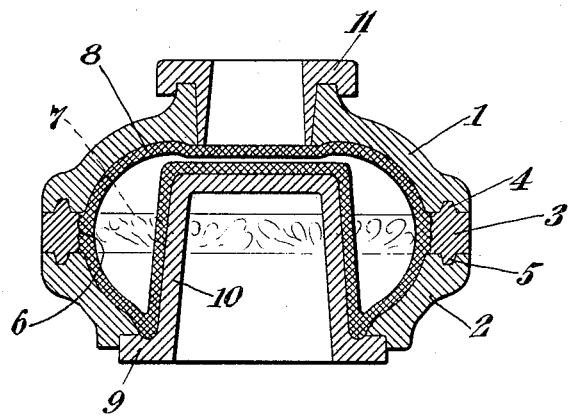
Figure 1 is a vertical section of a molding apparatus for use in connection with my invention.
Figure 2:
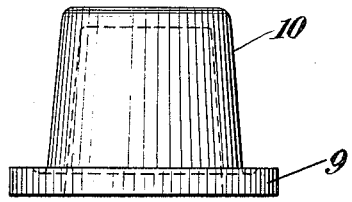
Figure 2 is a side elevation of the combined core and cover used therewith.
Figure 3:
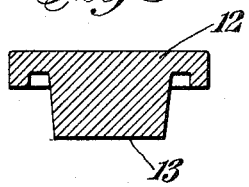
Figure 3 is a vertical section of a cover used at the end of my process as hereinafter described.

In the drawings I have shown a mold which in this instance is comprised of upper and lower annular portions 1 and 2 which may be of any desired metal as, for example, iron, brass, etc., having located between them a separable ring 3 of similar material provided with annular projections 4 and 5 fitting in similarly shaped recesses in the parts of the mold 1 and 2. The ring 3 has a surface 6 carrying a design to mold a design 7 upon the completed product, which in this instance is shown as a jardinière 8. The lower portion of the mold is closed by a combined cover and core 9 which has an upwardly directed frusto-conical core 10 with a smooth external surface, which will provide a smooth surface for the interior of the molded product 8. This may be made of a material similar to that used in the other portions of the mold. At the top of the mold there is a funnel-shaped cover 11, also made of similar material, which fits in the annular portion 1 of the mold. When the process has been partially completed as hereinafter described said funnel-shaped portion is removed and substituted by a cover 12, also of similar material, having a projection 13 fitting into the annular portion 1 of the mold and which is slightly shorter than the corresponding portion on the funnel-shaped member 11.

The composition for the molding operation is now prepared by melting a mixture containing for example approximately 53 parts by weight of finely divided sulphur and approximately 47 parts by weight of the sand blastings from metal castings, such, for example, as sand blastings from iron, brass or copper castings. These sand blastings are comprised of particles of sand, each of which has attached thereto as a coating or otherwise, minute portions of the metal from which the casting is made. To this molten mass maintained at any desired temperature to produce a homogeneous liquid, but preferably at a temperature of about 122° C., there is added a melted mixture of double the quantity of approximately 45 parts by weight of pulverized magnesite and approximately 55 parts by weight of pulverized sulphur heated to molten state but preferably to a temperature of 200° C. Preferably the second molten mixture is at a higher temperature than the first although this is not essential, as the composition containing magnesite is more viscous than the other composition to be mixed therewith. It will be understood that the metalliferous sand may be comprised of the mineral blastings of any desired character obtained by blasting any metal castings such as steel, iron, copper or brass castings with any finely divided abrasive material such, for example, as sand. Also it will be understood that instead of the magnesite any carbonate of an alkali earth metal may be used as, for example, marble, dolomite, etc. It will also be understood that substantially any proportions of the ingredients referred to may be used.

The mold set up as in Figure 1 is now filled with the molten mass made and prepared as described above but if desired in order to produce an object having an appearance of marble the second composition containing the magnesite or similar material may be introduced alternately with the proportions of the first mentioned composition. The filling of the mold is preferably conducted by pouring in the molten material gradually after the interior of the mold has been provided with a thin coating of a pure form of mineral and the core 10 will serve to prevent the molten material from splashing as said material will flow gently down the sides of the same. By avoiding splashing the production of imperfections on the exterior of the molded objects due to premature hardening of the splashed portions on the mold is obviated. In this way also the production of any air bubbles which will produce blemishes on the exterior of the molded object is avoided. The arrangement is such, furthermore, that the material cannot run down the inner walls of the mold. Also, the mold should be supported so as to be free from vibrations. The material is allowed to harden for a sufficient length of time to produce a wall of the solid material adjacent to the outer portion of the mold and adjacent to the core 10, but leaving a liquid portion between the same as shown in Figure 1. This will ordinarily require about one minute. When this stage of the process has been reached the liquid material still present in the hollow space referred to is poured out until the level is just below the bottom of the cover 11, thus leaving a small portion thereof which is allowed to remain in the cavity between the walls. The metal cover 12 is now applied to the top of the mold and the entire mold is inverted and allowed to remain in this position until a further quantity of the molten material has hardened so as to produce a solid base for the jardinière but leaving the hollow space as above referred to. By moving the mold into different positions from time to time the remainder of the molten liquid will be evenly distributed on the walls of the mold, thus leaving a hollow space so that the cracking of the product in its final stage of cooling, due to the internal pressure, is avoided. When the object has entirely hardened the mold is removed and it will be found that the product will have a smooth interior. Any traces of the junction points of the mold upon the object may be removed by grinding or otherwise. It will be found that the molded object has a very high gloss. If desired the surface of the molded object may now be preserved against any change by polishing the same with a material which will leave an extremely thin coating of such a character as to prevent oxidation. For this purpose I may use any composition containing a resinous or waxy material and a solvent as, for example, a composition containing 90% by weight of paraffin or bees wax and 10% by weight of rosin, the same being dissolved in enough turpentine or ether to form a cream therefrom. Other resins may be used as well as other waxes and other solvents but I have found that the alcohol soluble resins will not serve the desired purpose to preserve the surface of the molded product. The present composition referred to is used by rubbing the surface of the molded product and then polishing the same by rubbing with any kind of fabric desired.

When desired, decorative inlays can be made in the molded objects by introducing inlays of thin metal, paper or celluloid, etc., which are glued to the interior of the mold before pouring in the molten material. These inlays can be subsequently worked to produce any desired design with the aid of carving, colors, etc.

Where the forms are separable it will be understood that one or more portions may be changed therein at will to produce any desired form. In this way the number of different molds required may be decreased.

In my application Serial No. 579,957, filed August 5, 1922, process of molding and product thereof, I have described a method of introducing liquid material into a mold and forming an object therein, the composition of said material being similar to that used in the present case.

While I have described my invention above in detail I wish it to be understood that many changes may be made therein without departing from the spirit of the same.

I claim:

1. The process which comprises molding an object by pouring a molten material into a mold having a core, pouring out molten material therefrom to leave a hollow space when some of the molten material has hardened to form external and internal walls, then closing the mold to prevent the escape of the molten liquid remaining therein and allowing the same to harden to close the hollow space.

2. The process which comprises molding an object by pouring a molten material into a mold having a core with a smooth surface, pouring out molten material therefrom to leave a hollow space when some of the molten material has hardened to form external and internal walls, then closing the mold to prevent the escape of the molten liquid remaining therein and allowing the same to harden to close the hollow space.

3. The process which comprises molding an object by pouring a molten material containing sulphur and mineral blastings of iron castings into a mold having a core and pouring out molten material therefrom to leave a hollow space when some of the molten material has hardened to form external and internal walls, and then closing the opening from which the molten material was poured.

4. The process which comprises molding an object by pouring a molten material containing sulphur and abrasive blastings of metal castings into a mold having a core, pouring out molten material therefrom to leave a hollow space when some of the molten material has hardened to form external and internal walls, then closing the mold to prevent the escape of the molten liquid remaining therein and allowing the same to harden to close the hollow space.

5. The process which comprises molding an object by pouring a molten material containing sulphur and abrasive blastings of metal castings into a mold having a core with a smooth surface and pouring out molten material therefrom to leave a hollow space when some of the molten material has hardened to form external and internal walls, and then closing the opening from which the molten material was poured.

6. The process which comprises molding an object by pouring a molten material containing sulphur and abrasive blastings of metal castings into a mold having a core with a smooth surface, pouring out molten material therefrom to leave a hollow space when some of the molten material has hardened to form external and internal walls, then closing the mold to prevent the escape of the molten liquid remaining therein and allowing the same to harden to close the hollow space.

7. The process which comprises molding an object by pouring a molten material containing sulphur and sand blastings of metal castings into a mold having a core with a smooth surface, and pouring out molten material therefrom to leave a hollow space when some of the molten material has hardened to form external and internal walls, then closing the mold to prevent the escape of the molten liquid remaining therein and allowing the same to harden to close the hollow space.

8. The process which comprises molding an object by pouring a molten material containing sulphur and sand blastings of metal castings into a mold having a core with a smooth surface, pouring out molten material therefrom to leave a hollow space when some of the molten material has hardened to form external and internal walls, then closing the mold to prevent the escape of the molten liquid remaining therein and allowing the same to harden to close the hollow space.

9. The process which comprises molding an object by pouring a molten material containing sulphur, sand blastings of metal castings and a carbonate of an alkali earth metal into a mold having a core and pouring out molten material therefrom to leave a hollow space when some of the molten material has hardened to form external and internal walls, and then closing the opening from which the molten material was poured.

10. The process which comprises molding an object by pouring a molten material containing sulphur, sand blastings of metal castings and a carbonate of an alkali earth metal into a mold having a core with a smooth surface and pouring out molten material therefrom to leave a hollow space when some of the molten material has hardened to form external and internal walls, then closing the mold to prevent the escape of the molten liquid remaining therein and allowing the same to harden to close the hollow space.

11. The process which comprises molding an object by pouring a molten material containing sulphur, sand blastings of metal castings and a carbonate of an alkali earth metal into a mold having a core with a smooth surface, pouring out molten material therefrom to leave a hollow space when some of the molten material has hardened to form external and internal walls, then closing the mold to prevent the escape of the molten liquid remaining therein and allowing the same to harden to close the hollow space.

12. The process which comprises molding an object by pouring a molten material into a mold having a core, pouring out molten material therefrom to leave a hollow space when some of the molten material has hardened to form external and internal walls, then closing the mold to prevent the escape of the molten liquid remaining therein, allowing the same to harden to close the hollow space, and changing the position of the mold from time to time to distribute the molten liquid as it hardens over the different walls of the product.

In testimony that I claim the foregoing, I have hereunto set my hand this 5th day of July, 1922.

WILLY HENKER.